ance together with relatively high molecular weight, the ability to form tough flexible films and coatings and the ability to be handled easily during application in solutions of organic solvents and which, at the same time, are easily prepared from low cost starting materials. In other words, polymers of this type having the needed properties for many applications (especially high temperature applications) are for the first time made available practically speaking by the present invention.

United States Patent Office 3,507,832
Patented Apr. 21, 1970

3,507,832
AMORPHOUS COPOLY (PARA-ORTHO-PHENYLENE OXIDE)
Horace R. Davis, Roseville Village, and Charles W. Taylor, East Oakdale Township, Washington County, Minn., assignors to Minnesota Mining and Manufacturing Company, St. Paul, Minn., a corporation of Delaware
No Drawing. Continuation-in-part of application Ser. No. 641,464, May 26, 1967. This application July 22, 1968, Ser. No. 746,255
Int. Cl. C08g 23/17
U.S. Cl. 260—47
2 Claims

ABSTRACT OF THE DISCLOSURE

Certain novel copoly (para-ortho-arylene oxides) are disclosed. These polymers can be easily handled and used in solutions and have excellent resistance to high temperatures. A process of chain extending the polymers is also disclosed. The polymers disclosed herein have many uses, particularly in the field of protective coatings.

CROSS REFERENCE TO RELATED APPLICATIONS

This application is a continuation-in-part of the copending United States application Ser. No. 641,464 filed May 26, 1967 which was itself a continuation-in-part of the earlier United States application Ser. No. 392,937, filed Aug. 28, 1964, with which it was copending both now abandoned.

BACKGROUND OF THE INVENTION

The field of art to which this invention pertains is that of polyarylene oxide polymers, and more particularly to such polymers having improved properties. In one aspect, the invention relates to a novel class of amorphous, soluble, low melting, relatively high molecular weight polymers. In another aspect, the invention relates to films of these polymers and to articles coated therewith. In still another aspect, the invention relates to a process for the chain extension of certain soluble poly-(arylene oxides).

The preparation of poly-(phenylene oxides) has been reported by various workers heretofore, e.g. see United States Patent 2,961,384, British Patent 930,993 and Soc. Chem. Ind. (London) Monograph No. 13, pages 231–267. The polymers produced, however, have one or more of the following deficiencies: (1) low molecular weight, (2) instability at high temperatures (particularly for extended periods of time), (3) inability to form tough, flexible films and coatings and/or (4) intractability due to extensive uncontrolled crosslinking in the polymerization reaction. The utility of such substances, which are exemplary of the general art in this area, is accordingly limited.

In U.S. Patent 3,268,478, certain poly(pheylene oxides) are disclosed in which the repeating phenylene oxide units are meta oriented which apparently have many of the previously unavailable properties, in particular the greatly desired higher thermal stability. The meta-oriented polymers do not, however, represent a satisfactory solution to the problem of obtaining high temperature resistant poly-(phenylene oxides) since the meta-halophenols from which they are prepared are themselves prepared only at great difficulty by a multistep process and hence are so expensive that the meta polymers are, practically speaking, unavailable.

SUMMARY OF THE INVENTION

The present invention provides for the first time poly-(phenylene oxides) having extremely high thermal resistance together with relatively high molecular weight, the ability to form tough flexible films and coatings and the ability to be handled easily during application in solutions of organic solvents and which, at the same time, are easily prepared from low cost starting materials. In other words, polymers of this type having the needed properties for many applications (especially high temperature applications) are for the first time made available practically speaking by the present invention.

The polymers of the invention are copoly (para, ortho-phenylene oxides). They are prepared from ortho- and para-chlorophenols. The latter are easily produced in good yield by simply bubbling elemental chlorine through phenol and both are of the order of 100 times less expensive than the corresponding meta-halophenols. These copolymers are prepared in a homogeneous system using a soluble catalyst and a particular type of solvent. Considerable caution must be exercised from before the time of preparation of the monomer salts until the polymerization is complete to exclude and remove water and other impurities.

It is an object of the present invention to provide a new and useful class of polymers.

It is another object of the invention to provide a useful class of protective coatings.

It is another object of the invention to provide novel and useful polymeric films.

It is another object of the invention to provide a new class of thermally stable polymers.

It is still another object of the invention to provide a novel class of relatively high molecular weight soluble polymers which can be crosslinked to form tough, flexible films and coatings.

It is still another object of the invention to provide a novel class of intermediates in the preparation of certain highly adherent protective coatings.

It is a still further object of the invention to provide a novel class of intermediates in the preparation of certain, tough infusible, inert molded polymeric articles.

Additional objects will become apparent to those skilled in the art from reading the following specification.

The poly-(phenylene oxides) of the invention contain from about 45 to 75 mole percent of para-phenylene oxide units with the remainder being ortho-phenylene oxide units. They also have:

(1) Temperatures of 10% weight loss in air (as determined by thermogravimetric analysis (TGA) at a temperature rise rate of 5° C. per minute) of about 500° C. or above, (2) Softening ranges below 150° C. as determined by differential thermal analysis (DTA), (3) Inherent viscosities measured as 1 percent solutions of polymer in concentrated sulfuric acid (98 percent assay) of at least 0.3 and (4) Substantially complete solubility in benzene at 25° C.

The polymers preferably have molecular weights of 2000 or more for good mechanical properties (impact resistance, flexibility, etc.). The para-ortho-copolymers containing more than about 75 mole percent of para-phenylene oxide units tend to be not completely soluble (and not completely amorphous). This is a disadvantage in processing and handling. On the other hand, similar copolymers with less than about 45 mole percent para-phenylene oxide units tend to have too low a molecular weight for optimum mechanical properties. Although the flow points of the polymers of the invention are relatively low, they can be further reacted to form intractable and infusible materials by crosslinking through their terminal groups. Thus it is possible to take advantage of the high thermal stability properties of the polymers.

Since the TGA results correlate generally with the ability of polymers to withstand continual use at high temperatures, the high TGA values of the polymers of the invention are of great importance. The test is discussed in the article "Thermogravimetric Measurements" by A. E. Newkirk, Analytical Chemistry, vol. 32, p. 1558, 1960. The DTA test is discussed in Chapter IX in "Newer Methods of Polymer Characterization" edited by Bacon Ke and published by Interscience, New York, 1964.

The polymers of the invention are prepared by condensation polymerization of a monomer charge in the presence of a solvent and a catalyst (a soluble copper salt). Specifically, this is done by polymerizing a suitable mixture of para- and ortho-oriented potassium salts of monochlorophenols. The percentages of para phenylene oxide groups

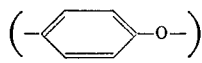

and ortho phenylene oxide groups

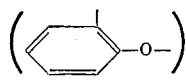

in the polymer is approximately determined by the relative amounts of ortho and para monomers in the charge.

More specifically, the polymerization process comprises: (1) the preparation of the potassium chlorophenolates, from o and p chlorophenols which contain essentially no phenol or polychlorophenol by neutralizing the chlorophenol with an aqueous potassium hydroxide in the absence of oxygen and air and with removal of water (2) the purification of the potassium chlorophenolates by crystallization from a non-aqueous solvent, the crystallized salts containing less than about 0.05 percent of water (by Karl Fischer analysis) and (3) the preparation of the polymer by charging the desired ratio of the monomer salts, 0.01 to 1 mole percent of a catalyst (a cuprous or cupric salt such as cuprous chloride, cupric chloride or cuprous cyanide) and two to one hundred weight percent of pyridine or quinoline to a suitable reaction vessel in the absence of oxygen and air and heating the mixture first to about 160–175° C. for about 2–24 hours and finally to about 200–275° C. for one or more hours.

Final reaction temperatures below 225° C. ordinarily result in reduced inherent viscosity, in lower number average molecular weight (determined for example by vapor pressure osmometry, $\overline{M}_{VPO}$) and in lower ability to form tough flexible films (e.g. as determined by the number of 180° folds a sample of film made from the polymer will survive after curing 16 hours at 400° C. with 5% dicumyl peroxide). Final reaction temperatures of 225–250° C. are frequently desirable to give best inherent viscosity and number average molecular weight.

Alternatively the isomeric phenols can be mixed in the desired proportions prior to neutralization with the potassium hydroxide and crystallization of the anhydrous salt from pyridine.

The exclusion of impurities from the monomer precursor, the monomer and the polymerization mixture (at least until the polymerization is complete) and the introduction of various specific ingredients at particular times during the whole process have been found to be critical to this process. Thus:

(1) The monomer must be made from at least about 98 percent pure chlorophenol (exclusive of water) which contains essentially no phenol or polychlorophenol (as determined by vapor phase chromatographic analysis).

(2) Oxygen must be carefully removed from both the chlorophenol and from the potassium hydroxide before they are mixed to form the monomer salt and continually excluded during salt preparation, drying and storage. If this is not done, there is extensive formation of color bodies in the solution which deposit on the otherwise colorless salt.

(3) The monomer should contain not more than about 0.05 percent of water (by Karl Fischer analysis) since higher percentages of water, tend to decrease the molecular weight of the polymers produced from it.

(4) The polymerization charge must contain from about .01 to about 1 mole percent of a cuprous or cupric salt as a polymerization catalyst. A lesser amount of catalyst is insufficient to bring about the desired polymerization while higher catalyst concentrations tend to produce lower molecular weight polymers.

(5) Oxygen should be excluded from the polymerization mixture since its presence tends to decrease the quality of the polymer.

(6) The polymerization reaction mixture must contain from about two to one hundred weight percent of pyridine or quinoline (based on the weight of the salt). If the pyridine or quinoline is not present in the reaction mixture, soluble polymer of much lower molecular weight is formed which contains relatively large amounts of insoluble cross-linked polymeric material.

In the preparation of the polymers it has been found to be advantageous to make the initial addition of the catalyst after the monomer salts have reached the fusion temperature of 150–160° C. with addition of fresh catalyst during the terminal stages of polymerization. Also a diluent such as diphenyl ether is desirably added in the final stages of the polymerization to reduce the viscosity of the reaction system. These make it possible to run the process at or near atmospheric pressure and to reduce the time of reaction. They result in a lighter colored product often with a higher molecular weight.

The linear (or essentially linear) copolymers resulting from this polymerization process are completely soluble in a number of different solvents (even at room temperature), low melting and amorphous (as shown by X-ray diffraction patterns of finely powdered polymers) and have relatively high molecular weights. The relatively high molecular weight of the soluble polymers is basic in providing the strength and stability to these polymers, whether they are ultimately used without further modification (e.g. as soluble thermoplastics) or are cured and crosslinked to form infusible, insoluble materials. The relative molecular weights of these polymers are conveniently indicated by their inherent viscosities in sulfuric acid. Polymers having inherent viscosities in sulfuric acid of about 0.3 or more have been found to have useful strength, flexibility and toughness.

Ordinarily soluble polymers having inherent viscosities of 0.3 or greater are prepared directly from the previously described polymerization process. If, however, it is desired to increase the molecular weight (and inherent viscosity) of a polymer produced by this process, the technique of fractionation or oxidation chain extension can be used. The fractionation can be carried out by dissolving the polymer in a solvent such as benzene, toluene or methylene chloride, filtering the solution through diatomaceous earth to remove any gel or inorganic salts occluded in the polymer, and then precipitating into methanol. The concentration of the polymer solution and the solvent affect to some extent the amount of low molecular weight polymer removed and thus the quality of the polymer recovered. In a typical experiment, polymer is dissolved in about 9 times its weight of benzene and precipitated by pouring the filtered solution into 3 volumes of methanol. If the solution is added with no more than nominal stirring, the high polymer comes down as a gummy lump while the lower molecular weight portion remains suspended as a milk in the benzene-methanol solution. This light portion can be recovered by evaporation of the milk to dryness, first on a steam bath and finally under vacuum.

The insoluble gummy lump is polymer plasticized with benzene which can be removed either by heating in vacuum (not ordinarily recommended as the mass tends to foam to many times its original size) or by extraction with methanol and finally washing with methanol in a blender.

The oxidative chain extension is carried out under mild conditions. This can be most easily accomplished by dissolving the polymer in a solvent and treating with an oxidizing agent such as the type which is capable of converting phenol to a phenoxy group. The chain extension appears to take place by reaction of free hydroxyl groups in the polymer. Among the oxidizing agents which can be used are sodium hypochlorite, lead tetraacetate, lead dioxide plus caustic, potassium ferricyanide plus oxygen, or cuprous chloride plus oxygen at temperatures in the range from room temperature to 250° C. The degree of chain extension is controlled by the amount of oxidizing agent and the temperature. This technique can be conveniently applied to the polymerization reaction product prior to workup by diluting with solvent, adding cuprous chloride and passing air through the mixture at 50° C. until the desired viscosity is obtained.

The soluble polymers of the invention are sometimes utilized directly, without modification. More frequently curing agents are incorporated into the polymers before they are applied in the location of their ultimate use. Among the useful curing agents are peroxides such as dicumyl peroxide, di-t-butyl peroxide, benzoyl peroxide, lauroyl peroxide and other free radical sources such as azobisisobutyronitrile. The curing (crosslinking) is normally completed with application of heat. The fully cured polymers are generally characterized as being tough, strong, flexible, non-fusible, non-soluble and chemically, hydrolytically and thermally inert.

Often also it is desirable to load or extend the resinous compositions, e.g. by the addition of particulate or fibrous fillers such as calcium carbonate, iron oxide, titanium dioxide, fuller's earth, quartz flour, asbestos, glass filaments, etc. or otherwise modify the electrical, physical or chemical properties of the resin by incorporation of plasticizers, colorants, resins, conductive materials such as carbon or metal powders, etc. which may be considered as adjuvants and the like.

Among the other adjuvants which may be used with the compositions of the invention are solvents, e.g. benzene, toluene and xylene, chlorinated solvents such as chloroform and methylene chloride, pyridine, tetrahydrofuran, dimethylformamide, dioxane, dimethyl acetamide, N-methyl pyrrolidone and diphenyl ether as well as high boiling stable fluids such as liquid polyphenylene oxides. Such solvents or fluids can be used to dilute or extend the compositions. Antioxidants, such as symmetrical di-$\beta$-naphthylparaphenylene diamine (available under the trade designation "Agerite White" from the R. T. Vanderbilt Company), certain liquid phenol-formaldehyde A-stage resins (e.g. "Stabilite White" liquid antioxidant, a product of C. F. Hall Company of Akron, Ohio), di-ortho tolyl ethylene diamine (available under the trade designation "Stabilite Alba" from C. F. Hall Company), etc., may also be added to the composition of the invention.

The following examples illustrate more specifically the preferred embodiments of the invention but are not to be construed as limiting thereof. Unless otherwise specifically indicated, the following apply in the examples: All parts are by weight. In the polymer examples, the softening ranges are determined by DTA (differential thermal analysis). The inherent viscosities are determined at 25° C. using a 1% solution of the polymer in concentrated sulfuric acid, said solution being prepared by heating the polymer and acid together, e.g. 30 minutes at about 145° C. is ordinarily sufficient.

MONOMER PREPARATION

The structural formulae and pyridine of crystallization of the following monomer preparations are as follows:

| Monomer designation | Formula | Pyridine of crystallization (moles per mole of monomer) |
|---|---|---|
| A | Cl—⟨⟩—OK | .67 |
| B | ⟨⟩(Cl)—OK | 0 |

Monomer A

Colorness p-chlorophenol (600 g., 4.67 moles) is weighed into a three-liter, three-neck flask with reagent pyridine (1400 cc.) and reagent benzene (250 cc.). The flask is assembled with a nitrogen inlet and dropping funnel on one side, a thermometer extending into the liquid in the center neck and a Barrett trap with reflux condenser and small column packed with 1/8" Pyrex helices between the flask and Barrett trap on the other side. About 550 g. of an aqueous solution of potassium hydroxide containing a total of 4.53 moles of carbonate-free potassium hydroxide (Kolthoff, Zeit, Anal. Chem., 61, 48 (1922)) is weighed into the dropping funnel and the entire apparatus is purged of oxygen by repeated evacuation and filling with purified nitrogen. The solution is stirred with a magnetic bar and the potassium hydroxide is allowed to run into the flask. The solution is heated to reflux while a slow stream of purified nitrogen is passed through the flask. Water is removed rapidly at first with a reflux rate at the capacity of the column. After 80–90% of the theoretical water has been removed, the boil-up rate is reduced to obtain separation (which requires a number of hours). In all, refluxing is continued 96–168 hours or until no further separation of an aqueous phase is observed. During this time the temperature of the boiling liquid rises from 90–95° to 110–112° as the last portions of water are removed. Removal of a portion of the benzene through the Barrett trap until the pot temperature reaches 117–120° C. facilitates removal of the last traces of aqueous phase. An additional 550 cc. of solvent are then removed through the Barrett trap causing the pot temperature to rise to 124–126° C. The remaining hot, clear solution is transferred through a glass delivery tube by nitrogen pressure to a filtering vessel with a sintered glass disc in its bottom and allowed to cool in the vessel while being supported from the bottom with nitrogen pressure. White needles quickly appear, and by the time the mixture reaches room temperature a solid white matrix of salt has formed. The moth liquor is removed by nitrogen pressure and the solid is broken up and washed with a minimum of dry benzene-pyridine (3:1). The solid is dried under nitrogen pressure until no further liquid comes through the filter, and then solvent is further removed by evacuation for several hours at room temperature. A constant weight is reached when the salt contains two molecules of pyridine of crystallization per three molecules of potassium p-chlorophenolate. Mechanical shaking and sieving in a closed system in an atmosphere of dry nitrogen are used to break the large lumps of solid into a fine, free-flowing powder.

Analysis for water by Karl Fischer reagent indicates that the salt contains less than 0.03 weight percent water. The pyridine of crystallization is readily removed by heating the salt in a steam bath in vacuo. Desolvated salt has a neutral equivalent (pH 6.0) of 166.1–167.0 (theoretical, 166.6), and melts without decomposition at 211–214° C. (evacuated capillary). With or without the solvent of crystallization it is very hygroscopic and must be stored under nitrogen. The yield of 770 g. is 77%.

Monomer B o-Chlorophenol is fractionated to remove traces of phenol, 2,4-dichlorophenol and p-chlorophenol that are present in the commercial material. Analysis of the colorless distillate by vapor phase chromatography shows the material is >99.9% pure.

A solution of 1200 g. of this material with 2400 cc. of pyridine (freshly distilled from barium oxide) and 600 cc. of reagent benzene is placed in a 5-liter three-necked flask that is equipped as in Example A (which described the preparation of monomer A) but excluding the thermometer. A standardized solution of 50 % aqueous, carbonate-free potassium hydroxide amounting to 97% equivalent to the phenol is placed in the dropping funnel, and the entire system is flushed 10–12 times by evacuation and filling with high purity nitrogen. The aqueous potassium hydroxide is then added to the flask while the system is flushed several additional times with nitrogen. Stirring is carried out magnetically.

Once all of the potassium hydroxide is added the dropping funnel is replaced with a thermometer extending into the liquid level and the solution is heated to reflux. Water is collected in the Barrett trap for about two days. Refluxing is continued for another 24 hours, and then benzene and pyridine are removed through the Barrett trap until the liquid temperature reaches 126–128° C. A column packed with either glass helices or with metal Podbielniak "Heligrid," may be used between the flask and the Barrett trap to facilitate the fractionation of the water-benzene azeotrope from the reaction mixture.

The resulting solution is then transferred with nitrogen pressure and while still hot to a closed filtering vessel containing 2500 cc. of dry reagent benzene. The product crystallizes quickly as white granules that settle to the bottom of the funnel. After the mixture has cooled to room temperature, the mother liquor is removed with nitrogen pressure, and the remaining solid is washed once with dry benzene and dried by evacuation at 100° C. The resulting solid potassium-o-chlorophenolate weighs 694 g. (46%) and contains .01–.02% water by analysis with Karl Fischer reagent. Titration with standard hydrochloric acid to pH 6.0 gives a neutral equivalent of 167.1; theoretical value of 166.6.

POLYMER PREPARATION AND EVALUATION

Example 1

Monomer B (610.2 g., 3.665 moles) is charged from a storage vessel through thin walled rubber tubing into a 3 l. stainless steel autoclave previously dried and purged with nitrogen at 200° C. Monomer A (1416 g., 6.450 moles) is then introduced in the same manner. Finally, 0.950 g. (0.095 mole percent) purified cuprous chloride is added and the addition assembly is replaced by the head of the autoclave. The autoclave is then evacuated for several hours, filled with nitrogen, sealed and placed in a rocking heater where it is held 14 hours at 180° C. and then 5½ hours at 250° C. (3 hrs. being required to attain each temperature level). The autoclave is then cooled to 100° C. and 1 l. of methylene chloride is added to the charge which is rinsed out of the autoclave with an additional liter of methylene chloride.

The polymer solution is added slowly to 5 gallons methanol which is being stirred with a Cowles Dissolver and the resulting solid is filtered, stirred with 4 N HCl and washed alternately with water and methanol (two times) and dried under high vacuum. The yield of tan polymer is 896 g. (96.4%).

Inherent viscosity:

1% solution in $CHCl_2$=0.268
1% solution in conc. $H_2SO_4$=0.518

This polymer has a softening range below 150° C. and is soluble in benzene.

A heavy walled glass ampoule is dried in an oven, evacuated and filled with nitrogen while being allowed to cool to room temperature. Monomer A (13.18 g., .0601 mole) and monomer B (6.74 g., .0404 mole) are then weighed directly into the ampoule, the transfer being made in such a way as to permit a minimum contact of the salt with the atmosphere. Purified cuprous chloride (10.6 mg., .11 mole percent) is then added and the ampoule is carefully evacuated to prevent bumping of the solid up into the vacuum manifold. Evacuation at room temperature and less than 1 mm. pressure is continued for 16 hrs. before the ampoule is sealed (still under vacuum).

The contents are then mixed by shaking and the ampoule is heated first for 16 hrs. at 160° C. and then for 6 hrs. at 250° C. The polymer is then recovered by treatment with 4 N hydrochloric acid followed by washing twice with water and then twice with methanol in a suitable mixing and grinding apparatus (such as a Waring Blendor). The yield of tan powder is 8.78 g., 94.5%. The inherent viscosity of the polymer in sulfuric acid is .394. The differential thermal analysis test does not show any sharp point of crystalline transition. There is, however, a gradual endothermic effect around 73° C. when the polymer first begins to soften. The polymer is soluble in benzene, toluene, chlorobenzene, pyridine, chloroform, methylene chloride and dimethylformamide at room temperature and is insoluble in methanol, acetone and hexane.

A number of other copolymers of the invention are prepared using the same procedure. Their preparation and characterization are summarized in the following table.

| Charge (mole percent) | | Yield, Percent | $H_2SO_4$ inherent viscosity | DTA softening range, ° C. |
|---|---|---|---|---|
| Monomer A | Monomer B | | | |
| 75 | 25 | 100 | .652 | <135 |
| 69.7 | 30.3 | 79 | .372 | 105 |
| 69.3 | 30.7 | 100 | .496 | <135 |
| 64.6 | 35.4 | 94.4 | .406 | <135 |
| 59.8 | 40.2 | 95 | .394 | 73 |
| 49.9 | 50.1 | 88.5 | .400 | <135 |
| 44.9 | 55.1 | 70.8 | .316 | <135 |

The polymers in the foregoing table are completely amorphous to X-ray, are soluble in all proportions at 25° C. in benzene, chloroform, toluene and chlorobenzene and the temperatures of 10 percent weight loss thereof in air (TGA, 5° C. per minute temperature rise) are 500° C. or above.

The process of Example 2 (infra) is usable to increase the molecular weight of any particular polymer if desired.

Example 2

Increase of polymer molecular weight by oxidative chain extension.

A solution of 10 g. copoly(p,o-phenylene oxide) (35.7% ortho, $\overline{M}_w$=4000, $<\eta>$=0.257 in $CHCl_3$) prepared by the general process described in Example 1 in 100 ml. toluene is filtered and placed in a 200 ml. flask equipped with magnetic stirrer. Aqueous 15% sodium hypochlorite (25 ml.) is added and the mixture stirred and heated at 90° C. for one hour. At the end of this time the reaction mixture is cooled and slowly added to 500 ml. of rapidly stirred methanol. The precipitated polymer is filtered and washed with 6 N HCl, water, and methanol and then dried yielding 10 g. (100% yield) light yellow polymer, $<\eta>$=0.54 (1% in chloroform), $\overline{M}_w$=8800. The product contains 1.0% chlorine as compared to the starting polymer which contained 0.4% chlorine.

A solution of 50 mg. cuprous chloride in 5 ml. pyridine is added to a solution of 2.0 g. copoly(p,o-phenylene oxide) (35.7% ortho, $<\eta>$=0.257, 1% in $CHCl_3$) in 20 ml. chlorobenzene. This mixture is heated to 50° C. while oxygen is bubbled through at 1 liter per minute. After one hour the mixture is cooled, quenched into methanol, and worked up as described above. A quantitative recovery of polymer having $<\eta>$=0.75 (1% in chloroform) is obtained.

Both of these chain extended polymers have temperatures of 10% weight loss in air (TGA, 5° C. per minute temperature rise) of 500° C. or above, softening ranges below 150° C., inherent viscosities in sulfuric acid above 0.3 and are completely soluble in benzene at 25° C.

Example 3

Polymer preparation in which the catalyst is added initially to the fused monomer salts and fresh catalyst is added during the terminal stages of polymerization and in which diluent is added during the terminal stages of polymerization.

A 2 liter 3-necked round bottom flask is equipped with reflux condenser, stirring assembly with a stainless steel blade, thermometer, and a nitrogen inlet. The top of the condenser is attached by a glass elbow to a receiving flask followed by a mercury trap to prevent oxygen or moisture entering the system. The apparatus is completely flushed with nitrogen and then charged with 823 g. (3.75 moles) monomer A and 378 g. (2.26 moles) monomer B through thin walled rubber tubing connecting the storage flasks to the apparatus. The flask is then heated with an electric mantle while a slow stream of nitrogen is passed through the system. The reaction mixture is fused at 160° C. at which point 0.601 g. purified cuprous chloride dissolved in 50 ml. dry purged pyridine is introduced through the nitrogen inlet with a hypodermic syringe. The mixture is stirred and refluxed for three hours after which the reaction temperature climbs slowly to 235° C. (one to two hours). An additional 0.090 g. cuprous chloride in 20 ml. pyridine is introduced and the stirring continued. As the viscosity increases, distilled diphenyl ether is added in three 200 ml. portions within a two-hour period after the last catalyst addition. At this stage the system is very viscous and must be thinned with 500 ml. purged pyridine. The mixture is cooled and quenched into methanol and worked up as described in Example 1. The yield of light tan, benzene soluble polymer is 495 g. (90% yield).

Inherent viscosity:
1% solution in $CHCl_3$=0.407
1% solution in $H_2SO_4$=0.420

The softening range in this polymer is below 150° C. and its temperature of 10% weight loss in air (TGA, 5° C. per minute temperature rise) is 500° C. or above.

Example 4

Preparation of a copolymer of the invention from the chlorophenols without isolating the monomer salts.

A one-liter three neck flask is equipped with a packed column topped by a Dean-Stark azeotrope separator and reflux condenser on the center neck, a nitrogen inlet and thermometer on one side and a dropping funnel on the other side. A Teflon-coated magnet is placed in the flask and a magnetic stirrer is placed beneath the heating mantle supporting the flask.

Pyridine (230 ml.), benzene (130 ml.), p-chlorophenol (84.1 g., 654 moles) and o-chlorophenol (45.3 g., .352 mole) are poured into the flask through one of the side necks and 45% aqueous potassium hydroxide (123.8 g., 8.11 me./g., 1.004 moles) is added to the dropping funnel.

The top of the reflux condenser is attached to a vacuum line and the system is flushed several times with nitrogen while the base is allowed to flow into the solution during 5–10 minutes. The system is finally restored to atmospheric pressure with nitrogen, and heat is applied while a slight positive pressure of nitrogen is maintained.

Water is removed by azeotropic distillation via the Dean-Stark trap until no further water separates from the benzene distillate. The temperature of the solution in the flask at this point is 120–125° C. The magnetic stirrer and the packed column are then removed, a mechanical stirrer is placed in the center neck, and the Dean-Stark trap and reflux condenser are put in the side neck in place of the dropping funnel. Solvent is removed through the Dean-Stark trap until the solution temperature reaches 160° C. A solution of 96 mg. of CuCl in 10 ml. of pyridine is added (conveniently by injection through the rubber tubing of the nitrogen inlet with a hypodermic syringe) and the temperature is maintained at 160–170° C. for 3.5 hours by removal of additional solvent as needed. Finally the temperature is raised to 250° C. for 2 hours; 70 ml. of phenyl ether is added if the solution begins to thicken. The heat is then removed, 80 ml. of pyridine is added and the entire mixture, after cooling, is precipitated in methanol using a blender or other rapid stirring device to disperse the solid polymer.

The slurry is filtered and the solid is washed successively with water, methanol, dilute hydrochloric acid and finally methanol before being dried in a vacuum oven at 50° C. The yield is 85.2 g. or 97%. The polymer is soluble in a variety of organic solvents including benzene, toluene, pyridine, chloroform, chlorobenzene and tetrahydrofuran. The differential thermal analysis (DTA) shows no crystalline melting point and the thermogravimetric analysis (TGA) shows a 10% weight loss at 500° C. The X-ray diffraction pattern of the solid is completely amorphous. The infrared spectrum of the polymer deposited on a sodium chloride crystal from chloroform solution shows no absorption for OH or aliphatic CH and is completely consistent with the structure, poly(p,o-phenylene oxide). The inherent viscosity of this polymer (in sulfuric acid) is greater than 0.3.

Example 5

Thermogravimetric analysis of the polymers of the invention.

The thermogravimetric analyses (TGA) of three polymers of the invention (prepared according to the processes of the foregoing examples) are as follows:

| Polymer lot No. | Charge, percent by weight | | TGA (10% wt. loss temp., ° C.) |
| --- | --- | --- | --- |
| | Monomer A amount | Monomer B amount | |
| 5a | 65.1 | 34.9 | 525 |
| 5b | 44.9 | 55.1 | 528 |
| 5c | 25.0 | 75.0 | 520 |

Example 6

Use of the polymers as protective coatings and preparation of unsupported films.

One gram of 60–40 para-ortho phenylene oxide copolymer of the invention [$<\eta>$=.544 ($H_2SO_4$)] is dissolved in 2.8 g. methylene chloride and 2.8 g. xylene, to which is added 0.05 g. t-butyl peroxide giving a 15% solution with 5 wt. percent of peroxide based on polymer. This is knife-coated at 11 mils on 10 mil aluminum sheet and heated at 200° C. for about 16 hours. The cured coating is tough, adherent, and resists undercutting by corrosive agents.

An aluminum sheet so coated is scratched in an X pattern and a drop of concentrated HCl is applied at the center of the X. The aluminum is etched through, but no penetration under the film occurs. A coated aluminum sheet is struck sharply with a ball-peen hammer, giving a 5 mm. indentation. Concentrated HCl placed in this indentation for several hours gives no reaction, indicating that no cracks are present in the film. The film is thus tough and can be deformed without breaking or cracking.

The aluminum is removed by concentrated HCl to give an excellent, smooth, clear, tough, flexible film.

Compositions based on other polymers described in these examples or other polymers of the invention can be formulated as described herein using various peroxide catalysts as well as other free radical sources and other compounding agents. The resulting materials can be applied to metal, ceramic, glass, plastics, filled plastic, laminate surfaces and cured as described herein, lower temperature and longer cure times being used for less thermally stable materials. Tough, flexible, adherent, insoluble coatings are obtained. The polymers can thus be used to produce chemical and solvent resistant coatings on a wide range of substrates.

The polymers can be handled as hot melts and in plastisol compositions as well as in solutions in organic solvents. They are useful as adhesives, sealants, laminating resins, and molded articles as well as coatings.

What is claimed is:

1. Amorphous unsubstituted poly-(phenylene oxide) containing from about 45 to 75 mole percent of para-phenylene oxide units with the remainder being ortho-phenylene oxide units, the polymer having
    (1) a temperature of 10% weight loss in air (as determined by thermogravimetric analysis at a temperature rise rate of 5° C. per minute) of about 500° C. or above
    (2) a softening range below 150° C. as determined by differential thermal analysis
    (3) an inherent viscosity measured as a 1 percent solution of polymer in concentrated sulfuric acid (98 percent assay) of at least 0.3 and
    (4) substantially complete solubility in benzene at 25° C.
2. A polymer according to claim 1 which contains about 65 mole percent para- and about 35 mole percent ortho-phenylene oxide units.

References Cited

UNITED STATES PATENTS

| | | | |
|---|---|---|---|
| 3,228,910 | 1/1966 | Stamatoff | 260—47 |
| 3,257,358 | 6/1966 | Stamatoff | 260—47 |
| 3,268,478 | 8/1966 | Brown et al. | 260—47 |
| 3,306,875 | 2/1967 | Hay | 260—47 |
| 3,313,776 | 4/1967 | Borman | 260—47 |

OTHER REFERENCES

Hill, Fibers from Synthetic Polymers, N.Y., Elsevier, 1964 (pp. 347–51).

Meares, Polymers: Structure and Bulk Properties, London, Van Nostrand, 1965 (pp. 26, 47).

WILLIAM SHORT, Primary Examiner

M. GOLDSTEIN, Assistant Examiner

U.S. Cl. X.R.

260—37, 33.6, 33.8, 30.2, 30.4, 32.6, 33.2, 45.9, 45.95; 117—132, 124, 138.8